(12) United States Patent
Ventz

(10) Patent No.: US 9,016,468 B2
(45) Date of Patent: Apr. 28, 2015

(54) CONVEYED GOODS DISTRIBUTOR

(75) Inventor: Kai Ventz, Delmenhorst (DE)

(73) Assignee: Transnorm System GmbH, Harsum (DE)

( * ) Notice: Subject to any disclaimer, the term of this patent is extended or adjusted under 35 U.S.C. 154(b) by 0 days.

(21) Appl. No.: 13/261,158

(22) PCT Filed: Aug. 9, 2010

(86) PCT No.: PCT/DE2010/000926
§ 371 (c)(1),
(2), (4) Date: Jan. 27, 2012

(87) PCT Pub. No.: WO2011/018071
PCT Pub. Date: Feb. 17, 2011

(65) Prior Publication Data
US 2012/0125745 A1 May 24, 2012

(30) Foreign Application Priority Data

Aug. 10, 2009 (DE) .................... 20 2009 010 788 U

(51) Int. Cl.
*B65G 47/64* (2006.01)
*B65G 21/14* (2006.01)
*B65G 23/00* (2006.01)
*B65G 47/26* (2006.01)

(52) U.S. Cl.
CPC .............. *B65G 47/647* (2013.01); *B65G 21/14* (2013.01); *B65G 23/00* (2013.01); *B65G 47/268* (2013.01)

(58) Field of Classification Search
USPC .................. 198/861.5, 792, 523, 575, 370.1, 198/370.06, 719; 14/71.1
See application file for complete search history.

(56) References Cited

U.S. PATENT DOCUMENTS

| 2,649,182 | A | * | 8/1953 | Parker ........................... 198/435 |
| 3,273,688 | A | * | 9/1966 | Foltz, Jr. ....................... 198/435 |
| 3,334,368 | A | * | 8/1967 | McIntosh et al. .............. 14/71.3 |
| 4,065,824 | A | | 1/1978 | Ellis et al. |
| 4,126,909 | A | * | 11/1978 | Smith et al. .................... 14/71.3 |

(Continued)

FOREIGN PATENT DOCUMENTS

| CN | 1944202 | 4/2007 |
| DE | 4339921 | 5/1995 |

(Continued)

OTHER PUBLICATIONS

International Search Report for PCT DE/2010/000926 (WO 2011/018071) dated Feb. 17, 2011.

*Primary Examiner* — Gene Crawford
*Assistant Examiner* — Lester Rushin
(74) *Attorney, Agent, or Firm* — Kenneth F. Pearce

(57) ABSTRACT

The invention relates to a device for distributing or bringing together conveyance flows, in particular a conveyed-goods distributor, comprising at least one conveying element (4) which can be adjusted, and at least one adjustment drive (5) for at least the conveying element, the adjustment drive (5) comprising at least one drive means (10) and a redirecting transmission (12), the redirecting transmission (12) being designed as a crank drive and being coupled to at least one mechanical energy store (19) as an auxiliary drive for at least one of the adjustment motions of the conveying element (4). According to the invention, the energy store is a spring element (19), one end (20) of which is accommodated in a rotationally fixed manner and the other end (21) of which is rotatably connected to a crank arm (14) of the crank drive.

15 Claims, 1 Drawing Sheet

(56) References Cited

U.S. PATENT DOCUMENTS

| | | | |
|---|---|---|---|
| 4,202,153 A * | 5/1980 | Lerner et al. | 53/459 |
| 5,568,857 A | 10/1996 | Chen et al. | |
| 6,227,537 B1 * | 5/2001 | Schmid | 271/217 |
| 6,484,869 B1 * | 11/2002 | Brouwer et al. | 198/592 |
| 8,342,311 B2 * | 1/2013 | Philipp | 198/345.1 |

FOREIGN PATENT DOCUMENTS

| | | | | |
|---|---|---|---|---|
| DE | 19914816 A | * | 3/1998 | B65H 29/16 |
| DE | 19914816 | * | 3/1999 | B65G 47/64 |

* cited by examiner

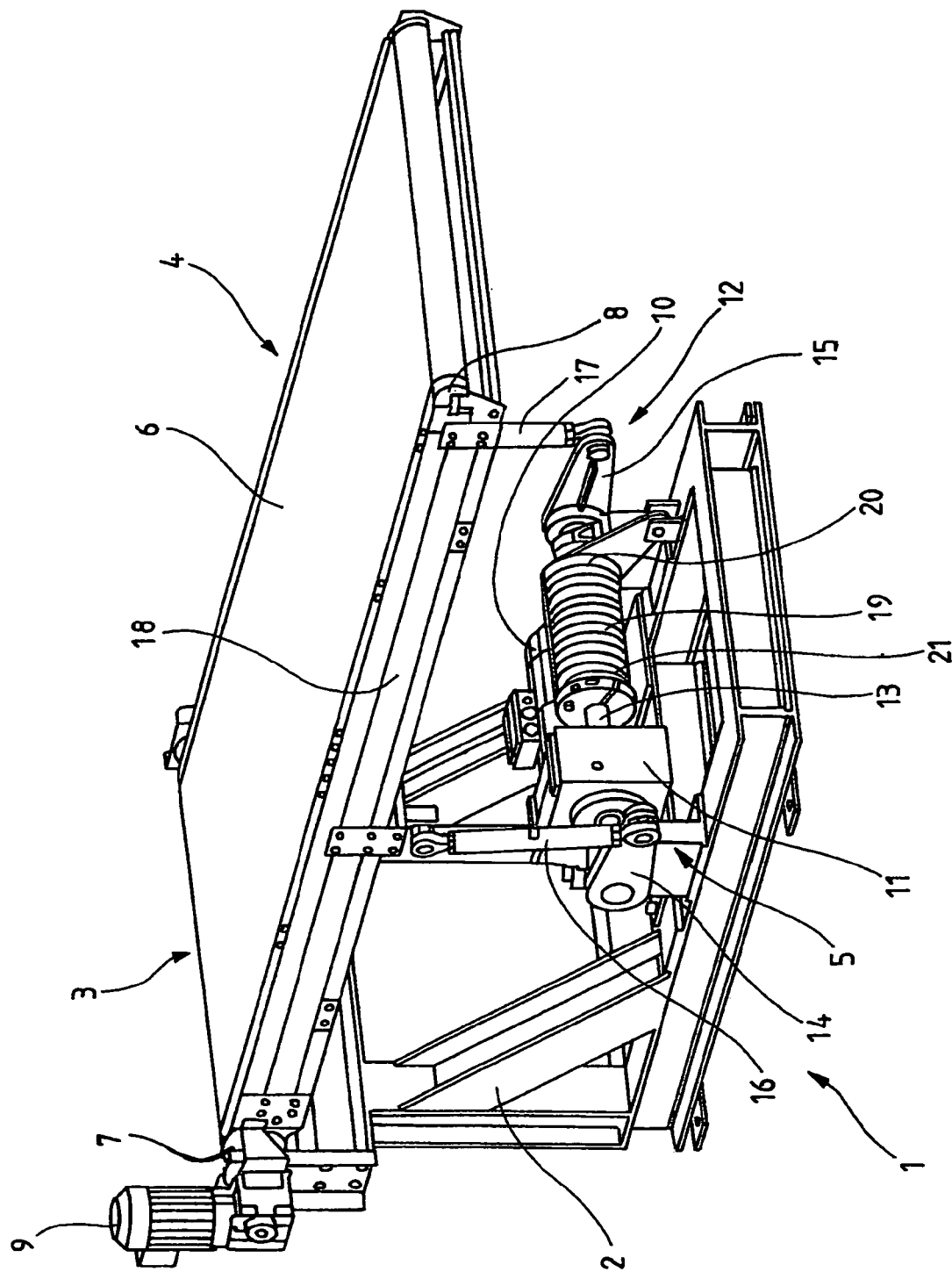

CONVEYED GOODS DISTRIBUTOR

The invention pertains to a device for distributing or bringing together conveyance flows, particularly a conveyed goods distributor, with at least one conveying element that is adjustable and with at least one adjustment drive for the conveying element, wherein the adjustment drive features at least one drive means and one angle gear, and wherein the angle gear is realized in the form of a crank drive and coupled to at least one mechanical energy storage in the form of an auxiliary drive for at least one of the adjustment motions of the conveying element.

Known devices consist, for example, of horizontal or vertical distributors that are used for ensuring the material flow, for example, of bulk materials or piece goods to be conveyed in manufacturing facilities, distribution centers or airports. For example, the conveyed goods arriving on a conveyor section are distributed over different conveyor sections and the conveyed goods arriving on different conveyor sections are brought together into a conveyance flow on a collecting conveyor section by means of such horizontal or vertical distributors.

Conveyed goods distributors of the above-described type feature at least one conveying element for the goods to be conveyed that frequently consist of piece goods, wherein the conveying element is usually held in a predefined alignment by means of a rack frame. In a vertical distributor, the conveying element that may be realized, for example, in the form of a belt conveyor or roller conveyor is then movably accommodated on the rack frame in a plane that is aligned approximately vertical to the surface normal. When using a horizontal distributor, the conveying element is typically adjusted together with the rack frame in a horizontally extending plane. In addition to the conveyor drive that is usually provided for the motion of the conveying element, conveyed goods distributors of this type also feature an adjustment drive for a restraint-guided adjustment motion of at least the conveying element. The driving power required for this purpose and the associated energy demand of the adjustment drive primarily depend on the starting torque to be generated that is defined by the mass of the conveying element and/or the rack frame and typically reaches its maximum at the beginning of the adjustment motion of the conveying element from a respective distributor position. Consequently, the drive means that, among other things, form the adjustment drive need to be rated excessively high with respect to the driving power to be generated over the remaining segment of the adjustment motion. Known devices for distributing or bringing together conveyance flows therefore have a relatively high energy demand and are the cause of correspondingly high fixed operating costs.

For example, DE 199 14 816 C2 discloses a device for distributing or bringing together conveyance flows that features an adjustment drive and a mechanical energy storage in the form of an auxiliary drive for an adjustment motion of the conveying element. The energy storage is realized, in particular, in the form of a tension spring and supports the drive means of the adjustment drive during the adjustment of the conveying element. In this case, the longitudinal axis of the tension spring is aligned in the direction of the adjustment motion of the conveying element. Their utilization results in a mounting with a relatively complicated construction, wherein the adjustability of the conveying element may also be restricted, if applicable, in the adjusting direction.

The invention is based on the objective of improving a device of the above-described type in such a way that a simplified and advantageously compact arrangement of the energy storage is achieved on the device.

According to the invention, this objective is attained with a device as shown in the drawing.

In a device for distributing or bringing together conveyance flows, particularly a conveyed goods distributor, with at least one conveying element that is adjustable and with at least one adjustment drive for the conveying element, in which the adjustment drive features at least one drive means and one angle gear, and in which the angle gear is realized in the form of a crank drive and coupled to at least one mechanical energy storage in the form of an auxiliary drive for at least one of the adjustment motions of the conveying element, the invention proposes that the energy storage consists of a spring element, one spring end of which is accommodated in a rotationally fixed fashion and the other spring end of which, is connected to and subjects the crank drive to a torque.

A device of this type that is designed in accordance with the invention makes it possible, in particular, to advantageously reduce the starting torque to be overcome by the adjustment drive at the beginning of the adjustment motion of the conveying element from a respective distributor position. Consequently, the adjustment drive that usually moves the conveying element back and forth between the distributor positions with high cycle frequency only needs to have a low permanent driving power such that the adjustment drive can have a correspondingly lower rating. In this case, the adjustment drive features at least one drive means and an angle gear that is realized in the form of a crank drive, wherein the energy storage is coupled to the angle gear. Due to the utilization of a crank drive, a rotary motion that is generated, for example, by the drive means is advantageously converted into a translatory motion as it is required, for example, for realizing an about vertically directed lifting motion to be carried out by the conveying element. The coupling of the energy storage that acts as an auxiliary drive to the angle gear also provides the advantage that the energy storage can be connected to the corresponding component of the gear, for example, such that it subjects said component to a torque or initiates a degree motion in an advantageously simple fashion. The angle gear may also be realized, for example, in the form of a pinion-synchronous belt drive. The energy storage consists, in particular, of a spring element, one spring end of which is accommodated in a rotationally fixed fashion and the other spring end of which is connected to and subjects the crank drive to a torque. Depending on the rotating direction of the crank drive, the spring element for realizing, in particular, the function of a torsion spring is either tensioned such that its potential energy is increased or relaxed, in which case the energy stored in the spring is applied to the crank drive in order to assist the adjustment drive.

The mechanical energy storage may also be realized, for example, in the form of a piston that is guided in a cylinder and coupled to the conveying element or the rack frame, wherein the idle position of the piston corresponds to its extended position and the cylinder is a closed system. When the piston is inserted from its idle position into its second, retracted end position, a compressed gas cushion acting against the piston is formed in the interior of the cylinder. Consequently, the force acting upon the piston during the return motion automatically assists the adjustment drive with the adjustment motion of the conveying element.

The conveying element preferably is adjustable in a vertical plane such that the auxiliary drive realized in the form of an energy storage carries and moves part of the mass of the conveying element to be moved, primarily during its upward motion. The inventive device is realized, in particular, in the form of a vertical distributor and therefore can be moved by the adjustment drive in a simplified fashion such that the conveying element can be more dynamically adjusted into a corresponding position.

The crank drive preferably features at least one shaft that is connected to the drive means, at least one crank arm that is connected to the shaft in a rotationally fixed fashion and at least one connecting rod that couples the crank arm and the adjustable conveying element to one another. In this context, the utilization of a crank drive represents an advantageous constructive option for realizing the angle gear. The crank drive makes it possible, in particular, to advantageously compensate shifting motions that can occur, for example, transverse to the lifting motion to be carried out by the conveying element.

The spring end of the spring element preferably is connected to and subjects one of the crank arms of the crank mechanism to a torque. Alternatively, the spring end of the spring element may be coupled to the shaft of the crank mechanism. Instead of a spring element in the form of a torsion spring, it would also be possible to use a spring element that consist of a tension spring or a pressure spring, wherein a spring element in the form of a pressure spring directly engages, for example, on the connecting rod of the crank drive with one end. If the spring element is realized in the form of a tension spring, it may be necessary to utilize a deflection pulley, wherein one spring end of the spring element is connected to the rack frame and the other spring end is connected to the crank drive via a corresponding traction means such as, for example, a traction cable that is guided over the deflection pulley.

According to an additional development of the invention, it is proposed that the spring element and the shaft of the crank drive are arranged relative to one another in such a way that the center axis of the spring element extends coaxial to the rotational axis of the shaft. An advantageously compact arrangement of the energy storage on the angle gear is achieved due to the spring element that preferably encases the shaft of the crank drive. In addition, the shaft of the crank drive advantageously guides the torsion spring on the shaft such that the spring element is prevented, in particular, from buckling out of its center axis in the tensioned state. In this case, the spring element may have a positive or negative spring tension in the respective distributor positions. Consequently, the neutral position of the spring element with no pretension may lie, for example, at half the distance between two distributor positions.

The conveying element is pivotably accommodated on a rack frame with one of its ends by means of a horizontally extending axle, wherein an advantageously simple and simultaneously secure connection is produced with the rotary bearing formed by the axle. The pivoting axis of the conveying element is preferably arranged congruent with the rotational axis of the driving drum of the conveying element that is realized, for example, in the form of a belt conveyor. This provides the advantage that one side of the device realized, for example, in the form of a vertical distributor has a constant height for receiving and delivering the conveyed goods.

In this case, the angle gear of the adjustment drive is connected to a section that lies at approximately half the length of the vertically adjustable conveying element. The design of the point, at which the angle gear of the adjustment drive engages, is dependent, in particular, on the own weight of the conveying element and the piece goods to be transported thereon, as well as the height difference between the individual distributor positions to be overcome by the vertical distributor. The arrangement of the angle gear at approximately half the conveying element provides the advantage that the driving power to be generated by the adjustment drive and the adjustment motion to be simultaneously carried out by the adjustment drive, particularly its connecting rod that is coupled to the crank arm, have an optimal ratio to one another.

According to another additional development of the invention, it is proposed that the drive means consist of an electric motor that makes it possible to generate a driving motion in an advantageously simple fashion. In addition, optimal applications of the device designed in accordance with the invention result from the high availability of primary energy required for the electric motor. It would naturally also be conceivable to use a hydraulic motor as drive means instead of an electric motor. It is naturally also possible to equip the drive means with a transmission gearing such that the torque to be generated by the drive means can be advantageously varied.

An exemplary embodiment of the invention with other inventive characteristics is illustrated in the drawing.

BRIEF DESCRIPTION OF THE DRAWINGS

The drawing shows a perspective view of an inventive device for distributing or bringing together conveyance flows.

The reference symbol 1 identifies a vertical distributor that features a rack frame 2, a conveying element 4 in the form of a belt conveyor that is pivotably coupled about one of its ends 3 and an adjustment drive 5 for the conveying element 4 that can be adjusted, in particular, in a vertical plane. The conveying element features, in particular, a belt band 6 and at least one driving drum 7 and one deflection drum 8, wherein the rotational axis of the driving drum 7 lies in the pivoting axis of the conveying element 4 that can be adjusted with respect to its incline. The driving drum 7 is connected to and subjects the conveyor drive 9 to a torque, wherein said conveyor drive preferably generates a constant rotary motion and thusly ensures a consistent transport speed. The adjustment drive 5 features, in particular, a drive means 10, a transmission gearing 11 and an angle gear 12 that is realized in the form of a crank drive. The angle gear 12 features at least one shaft 13 that is connected to and subjects the drive means 10 realized, in particular, in the form of an electric motor to torque via the transmission gearing 11. A crank arm 14, 15 is arranged on each end of the shaft 13 in a rotationally fixed fashion, wherein a connecting rod 16, 17 is arranged in an articulated fashion on the free end of each crank arm 14, 15 and respectively coupled to a frame 18 of the conveying element 4 by means of a corresponding contact point. The adjustment drive 5 furthermore features an energy storage 19 that acts as an auxiliary drive and carries, in particular, part of the load of the conveying element 4 in the tensioned state in order to thusly lower the starting torque to be overcome. The energy storage consists, in particular, of a spring element 19 that is rigidly connected, for example, to the rack frame 2 with one spring end 20 and may be coupled, in particular, to the shaft 13 of the adjustment drive 5 with its other spring end 21. The spring element 19 is tensioned and relaxed again depending on the rotating direction of the shaft 13. In this case, the shaft 13 and the energy storage in the form of a spring element 19 particularly have a common rotational axis.

The invention claimed is:

1. A device for moving goods; said device comprising:
 a) a conveying element pivotally connected to a rack frame; said conveying element further comprising a conveyor belt coupled at one end with a drum driving said conveyor belt, wherein a rotational axis of said drum is congruent with a pivoting axis of said conveying element;

b) an adjuster connected with said conveying element capable of moving vertically at least a portion of said conveying element between a first lower position, an intermediate position and a second higher position; said adjuster comprising:
  i) a shaft;
  ii) an electric motor drive capable of rotating said shaft;
  iii) one or more arms attached to said shaft, wherein at least one of said arms is subject to rotation of said shaft; and
  iv) one or more rods connected with said conveying element and articulated with said one or more arms; and
c) an auxiliary drive comprising a torsion spring coupled with and at least partially enclosing said shaft; said auxiliary drive capable of driving said conveying element toward said second higher position, and wherein said torsion spring further comprises:
  i) a first end that is rotationally fixed; and
  ii) a second end opposite said first end torquing and fixed to said shaft such that said torsion spring's tension is positive for assisting upward vertical movement of said at least a portion of said conveying element when said conveying element is at said first position and negative for assisting downward movement of said at least a portion of said conveying element when said conveying element is at said second position, and wherein said torsion spring's tension is about neutral when said conveying element is positioned about said intermediate position between said first lower position and said second higher position.

2. The device of claim 1, wherein said adjuster further comprises a transmission connected with said electric motor and said shaft.

3. The device of claim 2 wherein:
  a) a first one of said rods is connected to a first lengthwise side of said conveying element at an approximate midpoint of said first lengthwise side; and
  b) a second one of said rods is connected to a second lengthwise side of said conveying element at an approximate midpoint of said second lengthwise side.

4. A device for distributing or bringing together conveyance flows of goods; said device comprising:
  a) a conveying element pivotally connected to a rack frame; said conveying element further comprising a conveyor belt coupled at one end with a drum driving said conveyor belt;
  b) an adjuster connected with said conveying element capable of moving vertically at least a portion of said conveying element between a first lower position, an intermediate position and a second higher position; said adjuster comprising a motor drive and a crankshaft;
  c) an auxiliary drive comprising a spring coupled with said crankshaft capable of driving said conveying element toward said second higher position, wherein said spring's center axis is coaxial with a rotational axis of said crankshaft; and wherein said spring further comprises:
    i) a first end that is rotationally fixed; and
    ii) a second end opposite said first end torquing and fixed to said crankshaft such that said spring's tension is positive for assisting upward vertical movement of said at least a portion of said conveying element when said conveying element is at said first lower position and negative for assisting downward movement of said at least a portion of said conveying element when said conveying element is at said second higher position, and wherein said spring's tension is about neutral when said conveying element is positioned about said intermediate position between said first lower position and said second higher position.

5. The device of claim 4, wherein said crankshaft's crank further comprises:
  a) one or more arms, wherein at least one of said arms is subject to said torquing; and
  b) one or more rods connected with said conveying element and articulated with said one or more said arms.

6. The device of claim 5, wherein said motor drive is an electric motor and further comprises a transmission connected with said electric motor and said crankshaft.

7. The device of claim 6 wherein:
  a) a first one of said rods is connected to a first lengthwise side of said conveying element at an approximate midpoint of said first lengthwise side; and
  b) a second one of said rods is connected to a second lengthwise side of said conveying element at an approximate midpoint of said second lengthwise side.

8. A device for distributing or bringing together conveyance flows;
said device comprising:
  a) a conveying element pivotally connected to a rack frame; said conveying element further comprising a movable conveyor belt coupled at one end with a drum driving said conveyor belt;
  b) an adjuster connected with said conveying element capable of moving vertically at least a portion of said conveying element between a first lower position, an intermediate position and a second higher position; said adjuster comprising a first drive and a crankshaft;
  c) a second drive comprising a spring coupled with said crankshaft; said spring capable of driving said crankshaft in said first direction, and wherein said spring further comprises:
    i) a fixed first end; and
    ii) a second end opposite said first end torquing and fixed to said crankshaft such that said spring's tension is positive for assisting upward vertical movement of said at least a portion of said conveying element when said conveying element is at said first lower position and negative when said conveying element is at said second higher position, and wherein said spring's tension is about neutral when said conveying element is positioned about said intermediate position between said first lower position and said second higher position.

9. The device of claim 8, wherein at least a portion of said conveying element is adjusted vertically.

10. The device of claim 9, wherein said crankshaft's crank further comprises:
  a) one or more arms, wherein at least one of said arms is subject to said torquing; and
  b) one or more rods connected with said conveying element and attached to said one or more said arms.

11. The device of claim 10, wherein said spring's center axis is coaxial with a rotational axis of said crankshaft.

12. The device of claim 11, wherein said conveying element at a first end is pivotally attached to a frame.

13. The device of claim 12 wherein:
  a) a first one of said rods is connected to a first lengthwise side of said conveying element at an approximate midpoint of said first lengthwise side; and
  b) a second one of said rods is connected to a second lengthwise side of said conveying element at an approximate midpoint of said second lengthwise side.

14. The device of claim 13, wherein said first drive is an electric motor.

15. The device of claim 14, wherein said first drive further comprises a transmission connected with said electric motor and said crankshaft.

* * * * *